US005583998A

United States Patent [19]
Bowman

[11] Patent Number: 5,583,998
[45] Date of Patent: Dec. 10, 1996

[54] METHOD AND APPARATUS FOR INCREASING THE SPEED OF DATA EXCHANGE AMONG THE SUBSYSTEMS OF A DATA PROCESSING SYSTEM

[75] Inventor: David A. Bowman, Glendale, Ariz.

[73] Assignee: Bull HN Information Systems Inc., Phoenix, Ariz.

[21] Appl. No.: 9,366

[22] Filed: Jan. 26, 1993

Related U.S. Application Data

[63] Continuation of Ser. No. 811,105, Dec. 20, 1991, abandoned.

[51] Int. Cl.$^6$ ................................................. H01R 9/00
[52] U.S. Cl. .................... 395/280; 395/311; 395/282; 364/238.2; 364/240; 364/DIG. 1
[58] Field of Search ...................... 364/200, 900; 395/275

[56] References Cited

U.S. PATENT DOCUMENTS

| | | | |
|---|---|---|---|
| 4,214,302 | 7/1980 | Schmidt | 364/200 |
| 4,504,821 | 3/1985 | Barnes | 340/146.2 |
| 4,642,473 | 2/1987 | Bryant | 307/38 |
| 4,692,870 | 9/1987 | Manduley | 364/466 |
| 4,697,858 | 10/1987 | Balakrishnan | 439/61 |
| 4,817,275 | 3/1989 | Balogh, Jr. et al. | 364/900 |
| 4,835,737 | 5/1989 | Herrig et al. | 364/900 |
| 4,870,637 | 9/1989 | Follett et al. | 370/4 |
| 4,875,869 | 10/1989 | Bruen et al. | 439/189 |
| 4,905,182 | 2/1990 | Fitch et al. | 364/900 |
| 4,922,449 | 5/1990 | Donaldson | 364/900 |
| 4,999,805 | 3/1991 | Culley et al. | 364/900 |
| 5,010,445 | 4/1991 | Weinold | 361/392 |
| 5,050,041 | 9/1991 | Shafi | 361/391 |
| 5,051,606 | 9/1991 | Ikehara | 307/134 |
| 5,062,076 | 10/1991 | Ho et al. | 364/900 |

*Primary Examiner*—Christopher B. Shin

[57] ABSTRACT

In order to increase the information exchange speed among the several transaction members or subsystems organized around a bus carried on a backpanel, all lines of the bus are isolated, using CMOS switches, from the stub to each transaction member which is not instantaneously required for information exchange. The CMOS switches are physically placed as close as practical to the junction of each individual stub to the bus proper. This is achieved by placing the integrated circuits containing the CMOS switches on each subsystem circuit board proximate the male-edge-connector-to-female-edge-connector regions at which the junctions between the bus proper and the stubs are established. Preferably, the CMOS switch integrated circuits are emplaced on the backpanel itself proximate the edge connector regions communicating with each of the subsystems.

9 Claims, 5 Drawing Sheets

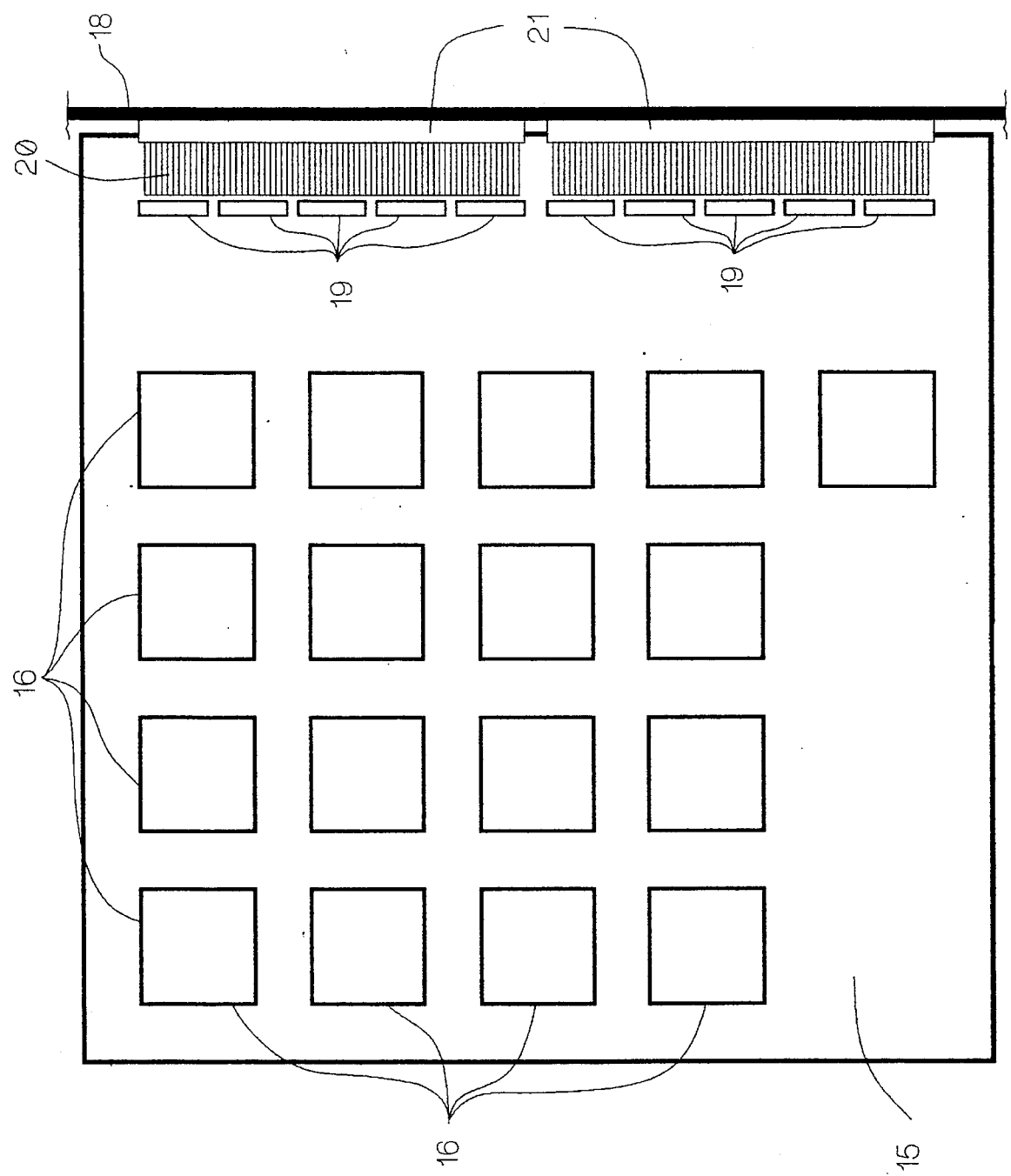

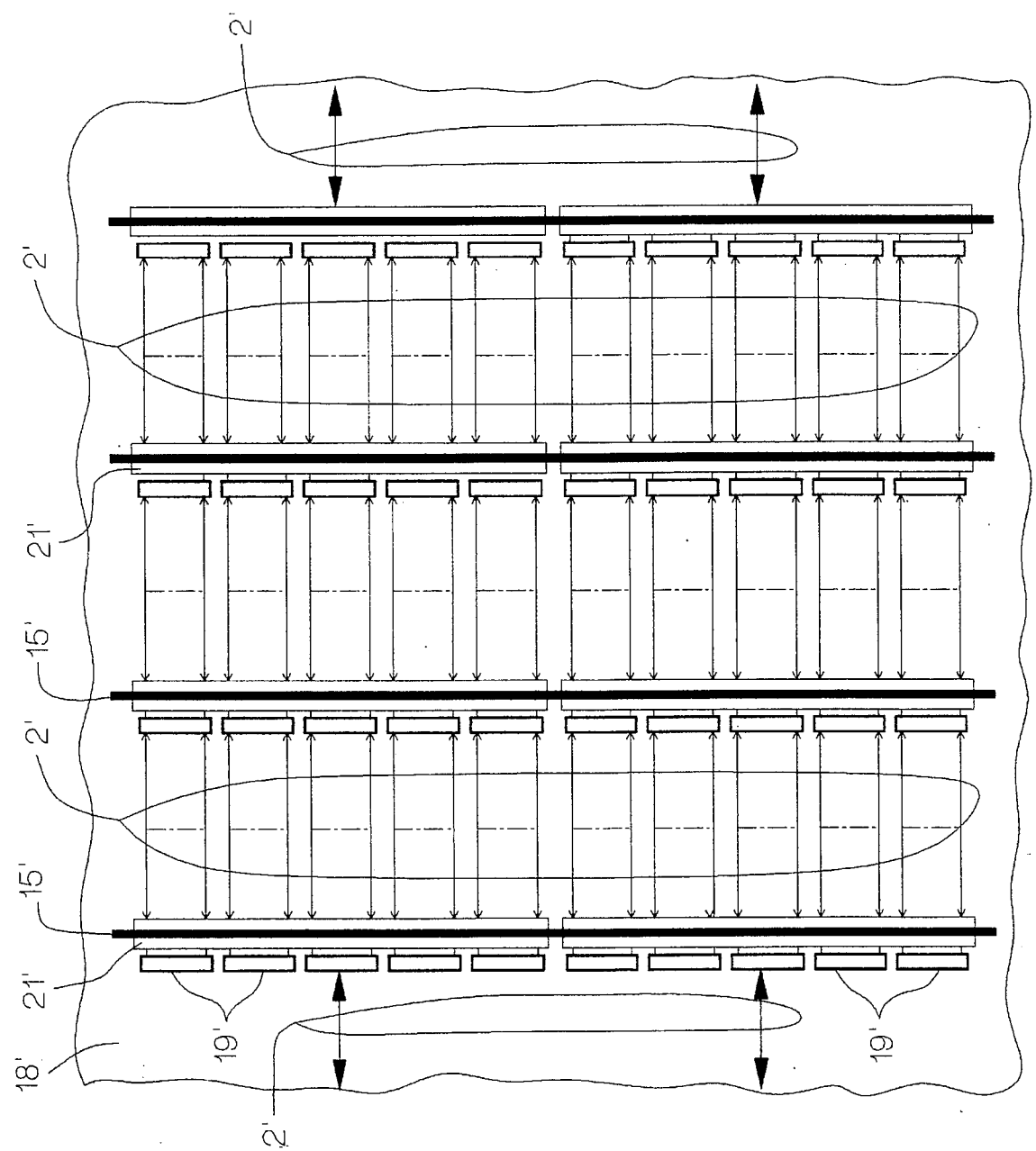

METHOD AND APPARATUS FOR INCREASING THE SPEED OF DATA EXCHANGE AMONG THE SUBSYSTEMS OF A DATA PROCESSING SYSTEM

This is a continuation of application Ser. No. 07/811,105 filed on Dec. 20, 1991, now abandoned

FIELD OF THE INVENTION

This invention relates to computer systems and, more particularly, to a computer system in which exchange of information among subsystems takes place on a backplane.

BACKGROUND OF THE INVENTION

The state-of-the-art of VLSI integrated digital circuits is constantly being pushed in, among other characteristics, speed capabilities. The density of state-of-the-art VLSI has reached a development stage at which it is possible to implement entire multi-processor systems in a single, relatively small housing with several subsystems, such as individual central processors, input/output units, system control units, memories, etc. each contained,or mounted on a single printed circuit board. These subsystems exchange information on busses which are often implemented as numerous conductive traces on a backpanel into which the subsystem circuit boards are plugged. The several subsystems communicating among themselves, or with one another, along a given bus are sometimes called "transaction members".

As the speed capabilities of the circuitry contained in subsystems has increased, limitations of the information transmission speed capabilities of busses have become a significant problem, the conductive traces, or electrical conductors, laid on a backpanel acting as considerably less-than-perfect transmission lines. Consequently, the system speed performance ratings have been correspondingly limited by the bus "bottlenecks".

In addition, the line driver for each line of a bus provided in each transaction member has had to have sufficient current driving capability to drive all the line receivers in all the other transaction members at the desired rate. This fact has brought about the necessity to oversize the drivers which increases initial system cost, requires more power and also adversely affects the bus speed performance because of the capacitive reactances of the bus lines when carrying higher than necessary currents. The currents are theoretically higher than necessary because it is rarely necessary for a given transaction member to transmit information to more than one or two other transaction members at a given instant even though there may be many more transaction members organized around a given bus. The present invention is directed to minimizing the speed and cost consequences of these two related characteristics.

OBJECTS OF THE INVENTION

It is therefore a broad object of this invention to provide improved speed transmission capabilities among the several transaction members organized around a bus in a data processing system.

It is another broad object of this invention to reduce the cost and power consumption of driver circuits in such transaction members.

It is a more specific object of this invention to provide such improved speed transmission capabilities by limiting the number of transaction members which a given transaction member must be able to drive at a given time.

In another aspect, it is a more specific object of this invention to minimize deleterious the effects on the transmission characteristics of a system bus caused by the bus branches leading to each of the several transaction members organized around a system bus.

SUMMARY OF THE INVENTION

Briefly, these and other objects of the invention are achieved by electrically isolating all lines of a system bus, using CMOS switches, from at list a portion of the stub, or bus branch, connecting each transaction member, or transaction subsystem, to the system bus, particularly those of transaction subsystems that are not selected to communicate with other transaction subsystems through the system bus at any given time. The CMOS switches are physically placed as close as practical to the junction of each individual stub or bus branch, to the system bus. This may be achieved by placing the integrated circuits containing the CMOS switches on each subsystems circuit board proximate the male-edge-connector-to-female edge connector regions through which electrical connections between the system bus and the circuits of a transaction subsystem can be established by a bus branch. Preferably, the CMOS switch integrated circuits may be emplaced on the backpanel itself proximate the edge connector regions communicating with each of the subsystems.

DESCRIPTION OF THE DRAWING

The subject matter of the invention is particularly pointed out and distinctly claimed in the concluding portion of the specification. The invention, however, both as to organization and method of operation, may best be understood by reference to the following description taken in conjunction with the subjoined claims and the accompanying drawing of which:

FIG. 4 is a plan view of one of the subsystems shown in FIG. 2 illustrating a first variant of the invention; and FIG. 5 is a plan view of a backpanel to which each of the several subsystems shown in FIG. 2 are connected and illustrating a second variant of the invention.

DESCRIPTION OF THE PREFERRED EMBODIMENT(S)

Figure 1:
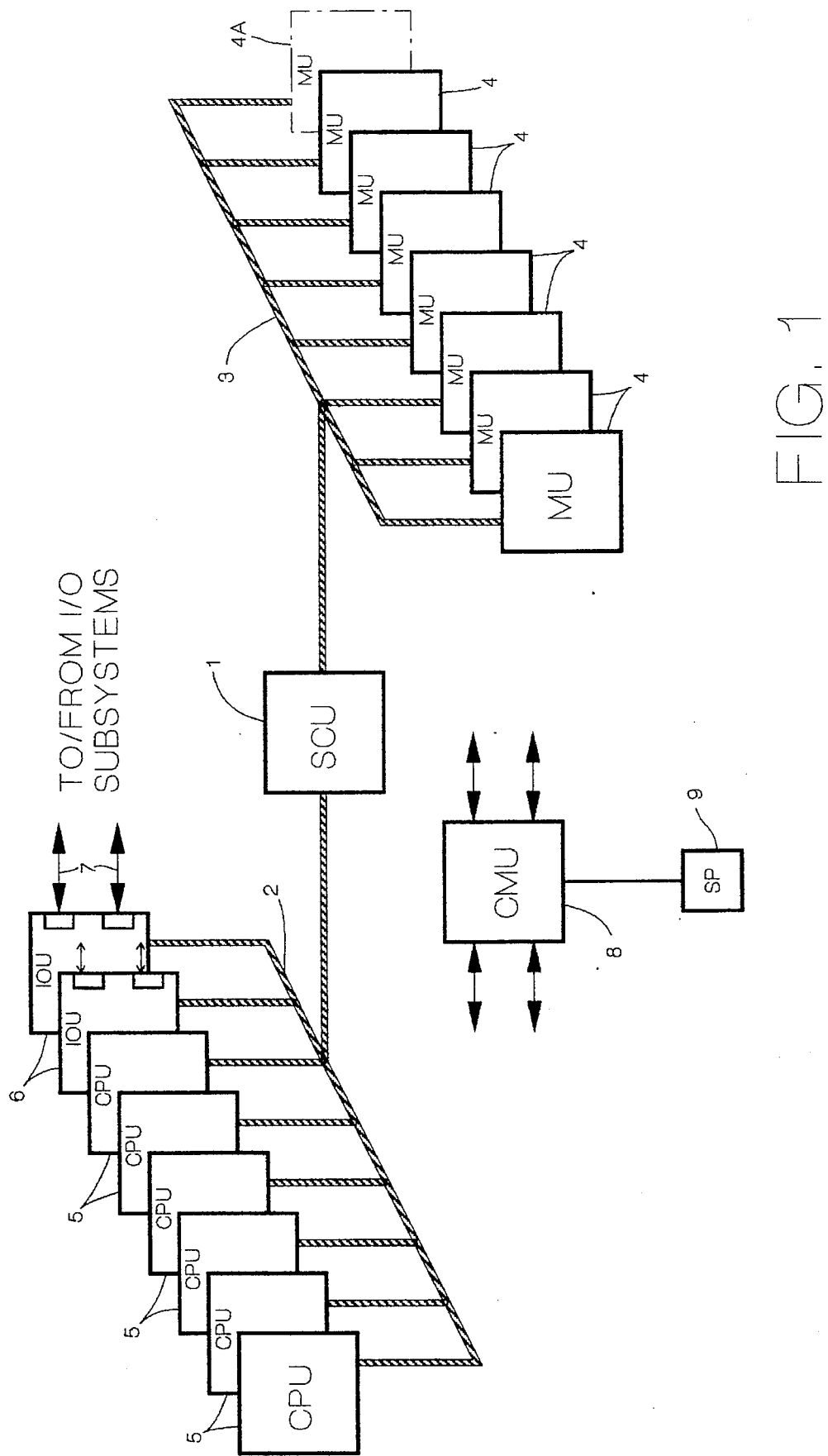
FIG. 1 is a very high level block diagram of the central system structure of an information processing system in which the subject invention finds application.

Attention is first directed to FIG. 1 which illustrates an exemplary Central Subsystem Structure (CSS) within which the subject invention may be incorporated. The System Control Unit (SCU) 1 centralizes and controls the system bus 2 and the memory bus 3 scheduling. More particularly, the SCU 1: A) performs memory control, single bit error correction and double bit error detection; B) controls the memory configuration of which there are one per Memory Unit (MU) 4; C) manages 64-byte block transfers between the Central Processing Units (CPUs) 5 and the MUs in conjunction with the store-into-cache feature of the CPUs; D) corrects single bit errors found in modified blocks of a CPU's cache or on a data transfer from a CPU, MU or Input/Output Unit (IOU) 6; and E) contains the system calendar clock.

The system bus 2 interconnects one to six CPUs and one or two IOUs with each other and with the SCU. The system bus includes a 16-byte bi-directional data interface, a bi-directional address and command interface, an SCU status interface monitored by all CPUs and IOUs, and a small number of control lines between the SCU and each individual CPU and IOU. Data is exchanged on the system bus in 16, 32 or 64-byte groups, and data exchanges can be between a CPU and an MU, an IOU and an MU, two CPUs and a CPU and an IOU. The operations through the system bus 2 are:

Read: 16, 32 or 64 bytes;

Read with exclusivity: 64 bytes;

Write from IOU: 16, 32 or 64 bytes;

Write from CPU (swapping): 64 bytes;

Interrupts and Connects; —Read/Write registers.

Every system bus operation consists of an address phase and a data phase, and an address phase can start every two machine cycles. Consecutive 16-byte data transfers within a group can occur on consecutive machine cycles. An IOU or CPU can wait for the data phase of up to two requests at the same time. The data blocks are transferred in the same order as the requests are received.

The memory bus 3 interconnects 1 to 8 MUs with the SCU. The memory bus includes a 16-byte bi-directional data interface, an address and command interface from the SCU to all MUs and a small number of control lines between the SCU and each individual MU. Data is exchanged on the memory bus in 16, 32 or 64-byte groups. The operations through the memory bus 3 are:

Read: 16, 32 or 64 bytes;

Write: 16, 32 or 64 bytes.

The main memory is composed of up to eight MUs. (A ninth slot, MU 4A, may be provided for ease of reconfiguration and repair in case of failure.) A single bit correction, double bit detection code is stored with every double word; i.e., 8 code bits for every 72 data bits. The code is arranged so that a 4-bit error within a single chip is corrected as four single bit errors in four different words. Data in an MU is addressed from the SCU in 16 byte (four word) increments. All bytes within any one MU are consecutively addressed; i.e., there is no interlace between MUs which operate in parallel. A memory cycle may start every machine cycle, and a memory cycle, as seen from a CPU, is ten machine cycles—assuming no conflicts with other units. An MU 4 contains 160 Dynamic Random Access Memory (DRAM) circuits, each of which has n by 4 bit storage elements where n=256, 1024 or 4096.

The IOUs 6 each provide a connection between the system bus 2 and two Input/Output Buses (IOBs) 7 such that each IOB interfaces with a single IOU. Thus, an IOU manages data transfers between the CSS and the I/O subsystems, not shown in FIG. 1.

A Clock and Maintenance Unit (CMU) 8 generates, distributes and tunes the clock signals for all the units in the CSS, provides the interface between the Service Processor(s) (SP) 9 and the central processing, input/output and power subsystems, initializes the units of the CSS and processes errors detected within the CSS units. The CSS employs a two-phase clock system and latched register elements in which the trailing edge of clock 1 defines the end of phase 1, and the trailing edge of clock 2 defines the end of phase two, each phase thus being one-half of a machine cycle.

The SP(s) 9 may be a commodity personal computer with an integrated modem for facilitating remote maintenance and operations, and large systems may include two SPs through which the system can be dynamically reconfigured for high availability. The SP performs four major functions:

monitors and controls the CSS during initialization, error logging and diagnostic operations;

serves as the primary operating system console during system boot or on operator command;

serves as console and data server for the input/output subsystems Maintenance Channel Adaptor (MCA);

provides a remote maintenance interface.

Figure 2:
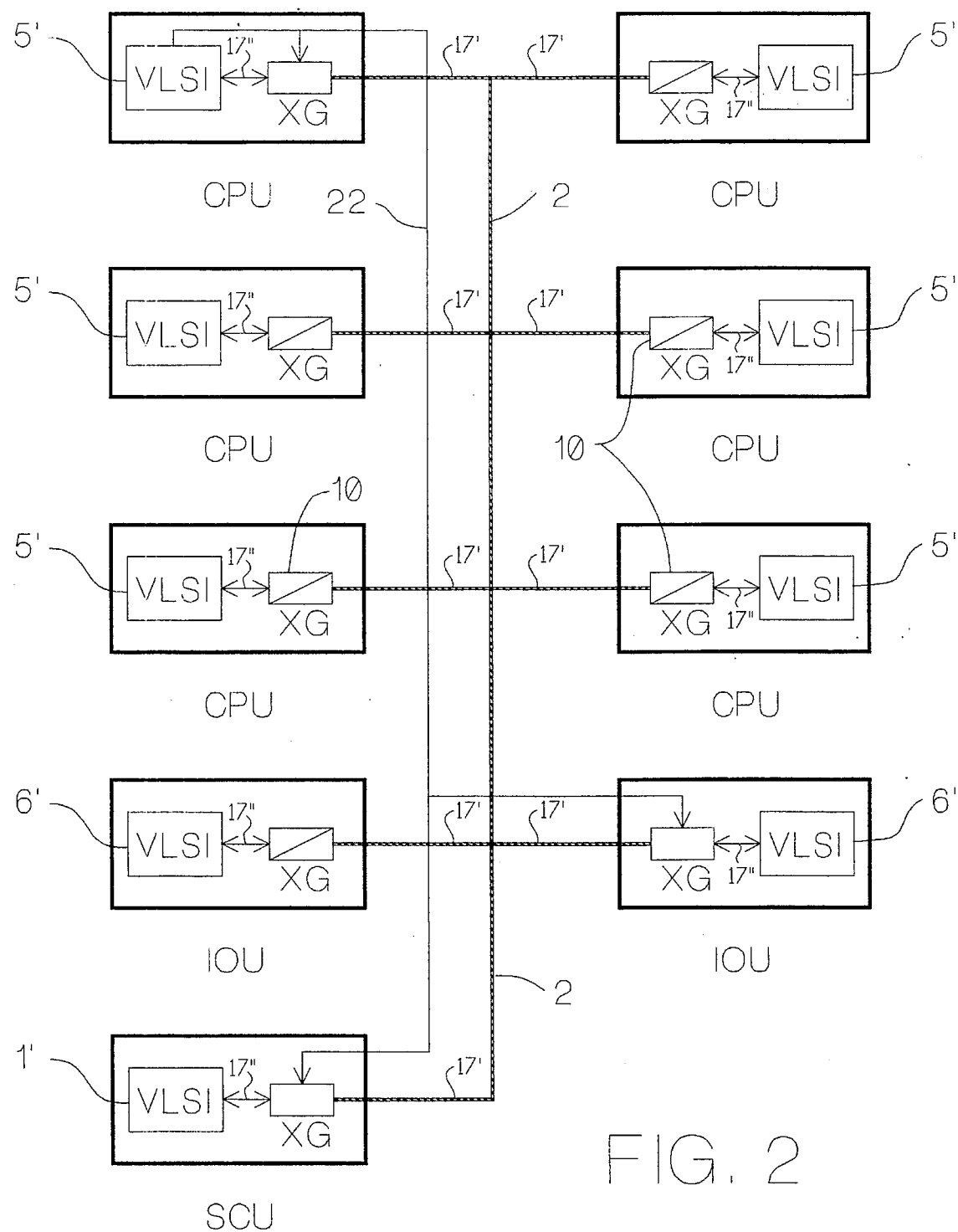
FIG. 2 is a slightly more detailed block diagram of the system organized around a single bus coupling several subsystems.

Attention is now directed to FIG. 2 which illustrates a group of transaction members which communicate with one another on the system bus 2. In the presently preferred embodiment of the invention, the system bus 2 is implemented on a single backplane or motherboard into which the several CPUs 5 and IOUs 6 and the single SCU 1, each a single VLSI (Very Large Scale Integrated) logic circuit board, are plugged as daughterboards.

The basic motherboard-with-daughterboards configuration described above is well known in the prior art, but has been the source of certain problems relating to the exchange of information such as data, addresses and commands, among the transaction members grouped around the system bus 2 as the speed of operation is inevitably increased in concert with the almost continuously increasing state-of-the-art speed capabilities of the logic circuitry which may be employed in a given system. Those skilled in the art will understand that the circuit traces on a backpanel, no matter how carefully planned and executed, are far removed from an ideal transmission line. They exhibit an excess of capacitive reactances among themselves and with respect to the circuitry on each of the VLSI logic boards. The bus extensions 17 or "stubs" of the system bus 2 extending to the logic circuitry on each logic daughterboard 15 further upset, a deteriorate, the system bus's transmission characteristics. The result of these effects is a very substantial decrease in the speed at which information may be exchanged among the transaction members from that which might be obtained if ideal transmission characteristics among the transaction members could be achieved.

In another aspect, the current handling capabilities of the bus driver circuitry associated with each of the transaction members in the prior art, has had to be capable of driving the receiver circuitry associated with all the other transaction members in parallel. This has been the case because the VLSI logic circuitry on each board typically has been fully driven with only a select signal applied directly to the VLSI logic determining whether a given board or board fraction is to be active at a given instant. Thus, the load on the bus drivers has been substantial, and it has therefore been necessary to provide them with far more current driving capacity than is desirable. This has, in turn, increased component cost, increased the logic area physically necessary to implement the drivers and, again, lowered the speed capabilities of the less-than-perfect transmission line (on the backplane) because of the excess current flow.

The present invention minimizes the speed penalties of the inevitably less-than-perfect transmission line(s) making up a backplane bus and the speed and cost penalties of providing more powerful then necessary bus drivers. Still referring to FIG. 2, it will be noted that the VLSI circuitry, or transaction members, 5', 6', 1' in each of the daughterboards is electrically isolated from the system bus 2 by a bi-directional transmission gate array XG 10. According to the invention, every line of the system bus 2 (e.g., 160 lines in one actual embodiment) must pass through a transmission gate in the array 10 of each of the transaction members in order to exchange information with the VLSI circuitry in a given transaction member. Moreover, the number of transaction members which can be active at a given instant is strictly limited to a predetermined number which is less than the number of transaction members organized around the system bus 2 and is three in the example shown in FIG. 2 This fact is represented by indicating certain transmission gate arrays 10 to be open ("off") at the instant depicted in FIG. 2 by a diagonal slash, three arrays however having the diagonal slash omitted to indicate that they are currently closed ("on") and that the VLSI on those boards are instantaneously active transaction members. The control necessary to manage the active/inactive states of the transmission gates resides in the logic of the participating VLSI transaction members and is conveyed on a select line 22.

In addition, to gain further advantages and as will be discussed more fully below, the transmission gate arrays are preferably placed as close as practical to the junctions of the motherboard and each of the daughterboards and may be physically positioned either on the motherboard of on each of the daughterboards.

Figure 3:
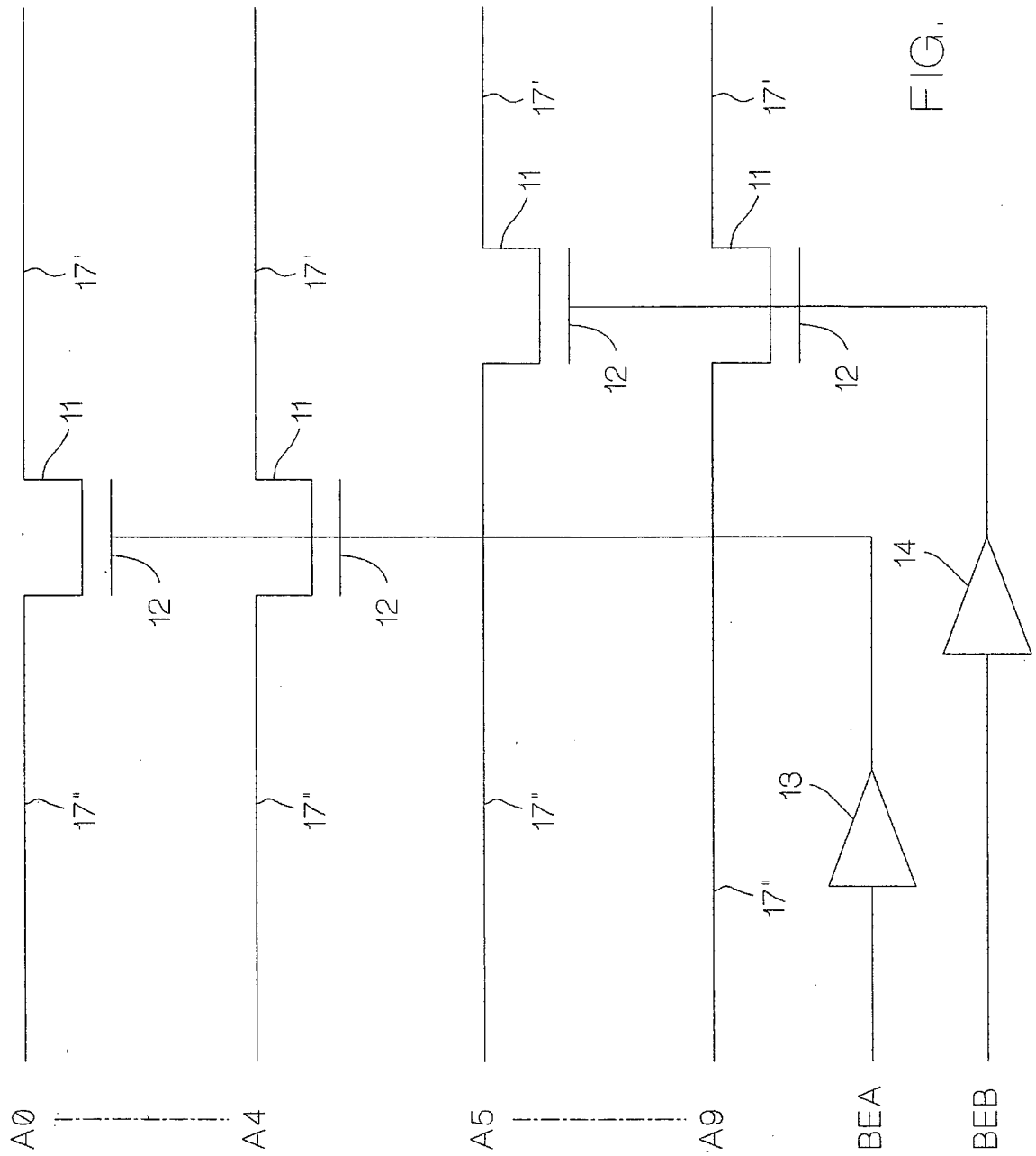
FIG. 3 is a schematic representation of one of the switch components of the invention.

The bi-directional transmission gate arrays XG 10 (which, it will be understood, are not the bus drivers which are instead incorporated into the VLSI circuitry of each logic board and, being conventional, are not shown separately) are preferably CMOS low on-resistance switches metal oxide on silicon transistors, compatible with the logic family employed in a given system. For example, and referring to FIG. 3 which is a functional block diagram of an integrated circuit containing ten high speed CMOS bus switches, each CMOS switch 11, a solid state metal oxide on silicon transistor, includes a gate electrode 12 which is driven by a driver. Driver 13, when enabled by the BEA signal, closes switches A0–A4; similarly driver 14, when enabled by the BEB signal closes switches A5–A9. An integrated circuit suitable for the application and containing ten CMOS switches as shown in FIG. 5 is available from Quality Semiconductor Inc. as Model QS54/74QST3384. In this Model, the series resistance of each switch when closed ("on") is about five ohms and when open ("off") is very high, infinity for practical purposes. The capacitance effects are minimal in either condition.

Referring again to FIG. 2, it will be understood that the transmission gate array XG 10 interfacing each of the transaction members with the system bus 2 may consist of sixteen of the exemplary Model QS54/74QST3384 integrated circuits to provide the ability to selectively switch all 160 lines of the system bus 2 to a given daughterboard. As a result, when a transaction member is sending information over the system bus 2 to one or two other transaction members, all the rest have their transmission gate arrays XG 10 held open, or off, and the conductor portions 17" of each bus branch 17 between an open switch of an open switch array 10 and the conductors and circuitry of the daughterboard 15 connected to, or associated with, each such open switch array 10 are effectively electrically isolated from the system bus 2. They thus cannot contribute to the speed reducing effects or capacitance of the speed reducing and power consuming effects of directly driven receivers. Consequently, in a given system configuration, speed of operation may be safely significantly increased and the power handling capacity of each line driver may be significantly reduced.

It has been found that the beneficial effects of using the transmission gate XG 10 arrays may be enhanced by placing them as close as practically possible to the junctions of the motherboard and daughterboards. FIGS. 4 and 5 illustrate alternative configurations for optimizing the beneficial effects of incorporating the transmission gate arrays in an exemplary environment in which the daughterboards each fit into a socket carried by the motherboard or backpanel.

Thus, in FIG. 4, a daughterboard 15 supports and couples various VLSI chips 16 which make up one of the subsystems or transaction members such as one of the CPUs 5 shown in FIGS. 1 and 2. The daughterboard 15 is plugged into a motherboard 18 which may be a system backplane carrying the conductive traces making up the system bus. It will therefore be understood that a plurality of daughterboards such as the daughterboard 15 are plugged into the motherboard 18.

In the example, one edge of the daughterboard 15 brings together the leads interfacing with the system bus as a male edge connector region 20 which is plugged into a female edge connector 21 carried on the motherboard 18. That is, all 160 bus interface connections to the motherboard, as well as various power connections, are made by the edge connector assembly 20, 21.

In accordance with one preferred embodiment of the invention, the several integrated circuits 19 containing CMOS bidirectional transmission gate arrays are disposed intermediate the male edge connector region 20 and the VLSI circuitry 16 (In FIG. 4, it may be assumed that each of the ten integrated circuits 19 contains sixteen CMOS switches.) It will be seen that the integrated circuits 19 are preferably positioned immediately adjacent the male edge connector region 20 in order to limit the length of any the portion of a branch bus 17 between system bus 2 and a bidirectional gate array 10 which is always connected to system bus 2 even when the transaction subsystem of the daughterboard is inactive, or has not been selected i.e., when the operating system has deselected (opened) the switches, or in gates, the integrated circuits.

FIG. 5 illustrates a variant and presently preferred position for the integrated circuits 19' containing CMOS bidirectional transmission gates which are positioned on the motherboard (backplane) 18' immediately adjacent each of the female edge connectors 21' which receive the circuit boards 15'. In this view, the system bus 2' can be seen to be coupled to the several circuit boards 15' (and other circuits not shown) for the exchange of information in accordance with the open or closed states of the CMOS switches contained in the integrated circuits 19'. This position for the integrated circuits 19' containing the CMOS switches is presently preferred because it further minimizes the length of the portion 17' of each bus extension 17 between the system bus 2' and the bidirectional transmission gates of IC circuits 19' which gates, when open, electrically isolate the portion 17" of each bus extension 17 and the circuits of the transaction subsystem connected to the IC circuits 19' from the system bus 2'.

Those skilled in the art will understand that the male/female characteristics of the daughterboard to motherboard coupling regions as described above may be the opposite of that described with the individual circuit boards carrying the female edge connectors which mate with male edge connector regions carried on the backpanel or motherboard.

Thus, while the principles of the invention have now been made clear in an illustrative embodiment, there will be immediately obvious to those skilled in the art many modifications of structure, arrangements, proportions, the elements, materials, and components, used in the practice of the invention which are particularly adapted for specific environments and operating requirements without departing from those principles.

What is claimed is:

1. In a data processing system including "n" transaction subsystems, where "n" is a positive integer greater than 3; and a system bus through which the transaction subsystems communicate with one another; each of the transaction subsystems being implemented with VLSI circuit chips mounted on a printed circuit daughterboard; the system bus being implemented on a printed circuit motherboard; electrical connections between electrically conductive traces of the system bus and the conductors and VLSI circuit chips of the daughterboard of each given transaction subsystem being by a bus branch through an edge connector assembly connecting each daughterboard to the motherboard; the improvements comprising:

"n" switch arrays, each of said switch arrays being comprised of a plurality of solid state switches, one solid state switch array being associated with each transaction subsystem and being mounted in each bus branch and dividing each bus branch into a first and a second portion, the first portion of each bus branch connecting a solid state switch of each switch array to a conductive trace of the system bus and the second portion of each bus branch connecting a solid state switch of each switch array to a conductor of each switch arrays' associated transaction subsystem; the solid state switches of a switch array when closed permitting electrical signals to be communicated between each closed switch array's associated transaction subsystem and the system bus; the solid state switches of a switch array when open substantially electrically isolating each open switch array's associated transaction subsystem from the system bus; and each of said switch arrays being positioned proximate the edge connector assembly; and circuit means of a transaction subsystem transmitting signals over the system bus, hereafter a transmitting transaction subsystem, to one or more transaction subsystems, hereafter a receiving transaction subsystem, connecting the transmitting transaction subsystem to the switch array associated with the transmitting transaction subsystem and to the switch arrays of each receiving transaction subsystems for closing the solid state switches of the switch arrays of the transmitting and receiving transaction subsystem; the solid state switches of all switch arrays of the data processing system not closed by said circuit means being open; a number less than "n" being the maximum number of switch arrays the solid state switches of which are closed at any one time by said circuit means.

2. The data processing system of claim 1 in which each of the solid state switches of each of said switch arrays is comprised of a metal oxide on silicon transistor.

3. The data processing system of claim 2 in which all of said switch arrays are situated on the motherboard proximate the edge connector assembly.

4. The data processing system of claim 2 in which all of said switch arrays are situated on the daughterboards proximate the edge connector assembly.

5. The data processing system of claim 3 in which the maximum number of switch arrays the solid state switches of which can be closed at any one time is three.

6. The data processing system of claim 4 in which the maximum number of switch arrays the solid state switches of which can be closed at any one time is three.

7. In a data processing system including "n" transaction subsystems, where "n" is a positive integer greater than 3; and a system bus having an information transmission rate through which the transaction subsystems communicate with each other; each of the transaction subsystems being implemented with VLSI circuit chips mounted on a printed circuit daughterboard; the system bus being implemented on a printed circuit motherboard; electrical connections between electrically conductive traces of the system bus and conductors and VLSI circuit chips of the daughterboard of each given transaction subsystem being by conductors of a bus branch through an edge connector assembly connecting each daughterboard to the motherboard; the method for increasing the information transmission rate of the system bus comprising the steps of:

mounting a switch array in each bus branch, each of said switch arrays being comprised of a plurality of solid state switches, each such array dividing the bus branch in which each switch array is mounted into a first and a second portion with each portion having a length, conductors of the first portion connecting each solid state switch of each gate array to a conductive trace of the system bus and conductors of the second portion connecting a each solid state switch of each switch array to a conductor of the motherboard of one of the transaction subsystems, each transaction subsystem connected to a switch array hereafter, referred to as the switch array's associated transaction subsystem; each switch array when the solid state switches of the array are closed permitting the switch array's associated transaction subsystem to communicate with the system bus; each of said switch arrays when the solid state switches of that switch array are open substantially electrically isolating the second portion of the bus branch in which the switch array is mounted and the switch array's associated transaction subsystem from the system bus;

minimizing the length of the first portion of each bus by positioning each of said switch arrays proximate the edge connector assembly;

selecting the transaction subsystems to communicate with one another, hereafter the selected transaction subsystem, by means of the system bus by closing the solid state switches of switch arrays connecting the selected transaction subsystems to the systems bus, the solid state switches of switch arrays of non-selected transaction subsystems being open; and limiting to a number less than "n" the number of the selected transaction subsystems that can communicate over the system bus at any one time.

8. The method of claim 7 in which each solid state switch consist of a metal oxide on silicon transistor.

9. In a data processing system including "n" transaction subsystems, where "n" is a positive integer greater than 3; and a system bus through which the transaction subsystems communicate with one another; each of the transaction subsystems being implemented with VLSI circuit chips mounted on a printed circuit daughterboard; the system bus being implemented on a printed circuit motherboard; electrical connections between electrically conductive traces of the system bus and conductors and VLSI circuit chips of the daughterboard of each given transaction subsystem being by conductors of a bus branch through an edge connector assembly connecting each daughterboard to the motherboard; the improvements comprising:

"n" switch arrays, each of said switch arrays being comprised of a plurality of metal oxide on silicon transistors, one switch array being associated with each transaction subsystem and being mounted in each bus branch and dividing the conductors of each bus branch into a first and a second portion, the conductors of the first portion of each bus branch connecting one of said transistors of each switch array to a the conductive trace of the motherboard, and the conductors of the second portion of each bus branch connecting a transistor of each switch array to a conductor of each switch arrays' associated transaction subsystem; each of said transistors of a switch array when closed permitting electrical signals to be communicated between a conductive trace of the system bus and a conductor of the switch arrays associated transaction subsystem; said transistors of a switch array when open substantially electrically isolating each open switch array's associated transaction subsystem from the system bus; and each of said switch arrays being positioned on the motherboard; and circuit means of a transaction subsystem transmitting signals over the system bus, hereafter a transmitting transaction subsystem, to one or more transaction subsystems, hereafter a receiving transaction subsystem, connecting the transmitting transaction subsystem to the transistors of the switch array associated with the transmitting transaction subsystem and to the transistors of the switch arrays of each receiving transaction subsystems for closing the transistors of the of the switch arrays of the transmitting and receiving transaction subsystem; all transistors of switch arrays of the data processing system not closed by said circuit means being open; three being the maximum number of switch arrays whose switch elements are closed at any one time by said circuit means.

\* \* \* \* \*